(12) United States Patent
Yasuda et al.

(10) Patent No.: US 7,331,834 B2
(45) Date of Patent: Feb. 19, 2008

(54) OUTBOARD MOTOR

(75) Inventors: Koji Yasuda, Saitama (JP); Akiko Ichikawa, Saitama (JP); Mitsuaki Kubota, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/633,846

(22) Filed: Dec. 5, 2006

(65) Prior Publication Data

US 2007/0141924 A1    Jun. 21, 2007

(30) Foreign Application Priority Data

Dec. 7, 2005    (JP)    ............................. 2005-354033

(51) Int. Cl.
*B63H 21/21*    (2006.01)
(52) U.S. Cl. ....................................... 440/87
(58) Field of Classification Search .................. 440/63, 440/84, 87
See application file for complete search history.

(56) References Cited

U.S. PATENT DOCUMENTS 5,797,777 A * 8/1998 Tsunekawa et al. ........... 440/84
5,941,188 A * 8/1999 Takashima ................. 114/55.5
6,491,555 B2 * 12/2002 Kitsu et al. .................... 440/87
2002/0090866 A1 * 7/2002 Hoshina ....................... 440/84

FOREIGN PATENT DOCUMENTS

JP    63-158493    10/1988

* cited by examiner

*Primary Examiner*—Stephen Avila
(74) *Attorney, Agent, or Firm*—Carrier, Blackman & Associates, P.C.; Joseph P. Carrier; William D. Blackman

(57) ABSTRACT

An outboard motor is provided with a bar handle equipped with a throttle grip enabling push-pull operation and rotate operation by the boat operator, and one or the other of the engine and the motor is connected to the propeller in accordance with the push-pull operation of the throttle grip. Owing to this configuration, switching between the power sources can be performed using the throttle grip of the bar handle. In addition, the engine speed and motor speed are regulated in accordance with the rotating operation of the throttle grip, thereby avoiding degradation of operability and increase in outboard motor size.

7 Claims, 6 Drawing Sheets

FIG. 5

| | MOTOR | ENGINE | CLUTCH |
|---|---|---|---|
| 1ST CONTACT ON (MOT) | SUPPLIED WITH ELECTRIC POWER | NOT SUPPLIED WITH ELECTRIC POWER | NOT SUPPLIED WITH ELECTRIC POWER |
| 2ND CONTACT ON (OFF) | NOT SUPPLIED WITH ELECTRIC POWER | NOT SUPPLIED WITH ELECTRIC POWER | NOT SUPPLIED WITH ELECTRIC POWER |
| 3RD CONTACT ON (ENG) | NOT SUPPLIED WITH ELECTRIC POWER | SUPPLIED WITH ELECTRIC POWER | SUPPLIED WITH ELECTRIC POWER (WHEN ENGINE SPEED IS HIGHER THAN PREDETERMINED SPEED) |
| 4TH CONTACT ON (ST) | SUPPLIED WITH ELECTRIC POWER | SUPPLIED WITH ELECTRIC POWER | SUPPLIED WITH ELECTRIC POWER |

OUTBOARD MOTOR

FIELD OF THE INVENTION

This invention relates to an outboard motor, particularly to a hybrid outboard motor equipped with an internal combustion engine and an electric motor as power sources that can be selectively brought into connection with a propeller.

CROSS-REFERENCE TO RELATED APPLICATION

This invention claims priority under 35 USC 119 based on Japanese Patent Application No. 2005-354033, filed on Dec. 7, 2005, the entire disclosure of which is incorporated herein by reference.

DESCRIPTION OF THE RELATED ART

Japanese Laid-Open Utility Model Application No. Sho 63(1988)-158493(particularly FIG. 5) teaches an example of an earlier-developed hybrid outboard motor equipped with an engine and an electric motor as power sources that can be selectively brought into connection with a propeller. Moreover, an outboard motor that uses an electric motor to drive the propeller is known in which a bar handle attached to the outboard motor to be rotatable about its axis can be rotated to regulate the speed of the motor (see, for example, Japanese Patent No. 2603841,particularly page 2, left column, line 33 to page 3, left column, line 16).

SUMMARY OF THE INVENTION

In a hybrid outboard motor, it is necessary to connect one or the other of the power sources, either the engine or the motor, to the propeller and regulate the speed of the connected power source. Therefore, when the teaching of the second reference is applied to the hybrid outboard motor described in the first reference, a mechanism for switching between the power sources and a mechanism for regulating the speed of the engine have to be provided in addition to the bar handle, so that operability is degraded and the size of the outboard motor becomes large.

An object of this invention is therefore to overcome the foregoing drawbacks by providing a hybrid outboard motor in which power source switching and speed regulation are performed using a throttle grip provided on the bar handle, thereby enabling to avoid degradation of operability and increase in outboard motor size.

In order to achieve the object, this invention provides an outboard motor adapted to be mounted on a stern of a boat and having power sources constituted by an internal combustion engine and an electric motor which are selectively connected to a propeller to propel the boat, and a bar handle whose free end projects toward a cockpit of the boat so as to be operable for an operator to steer the boat; comprising: a throttle grip provided at the free end of the bar handle to be pushed-pulled in a longitudinal axis of the bar handle and to be rotated about the axis by the operator; a power source selector provided at the throttle grip which selects one of the engine and the motor to connect to the propeller in response to the push-pull operation of the operator; an engine speed controller provided at the throttle grip which controls a speed of the engine by regulating a throttle opening of the engine in response to the rotational operation of the operator; and a motor speed controller provided at the throttle grip which controls a speed of the motor in response to the rotational operation of the operator.

BRIEF DESCRIPTION OF THE DRAWINGS

The above and other objects and advantages of the invention will be more apparent from the following description and drawings in which:

FIG. 5 is a chart for explaining the supply of operating power by a battery shown in FIG. 1.

DETAILED DESCRIPTION OF THE PREFERRED EMBODIMENT

An outboard motor according to preferred embodiments of the present invention will now be explained with reference to the attached drawings.

Figure 1:
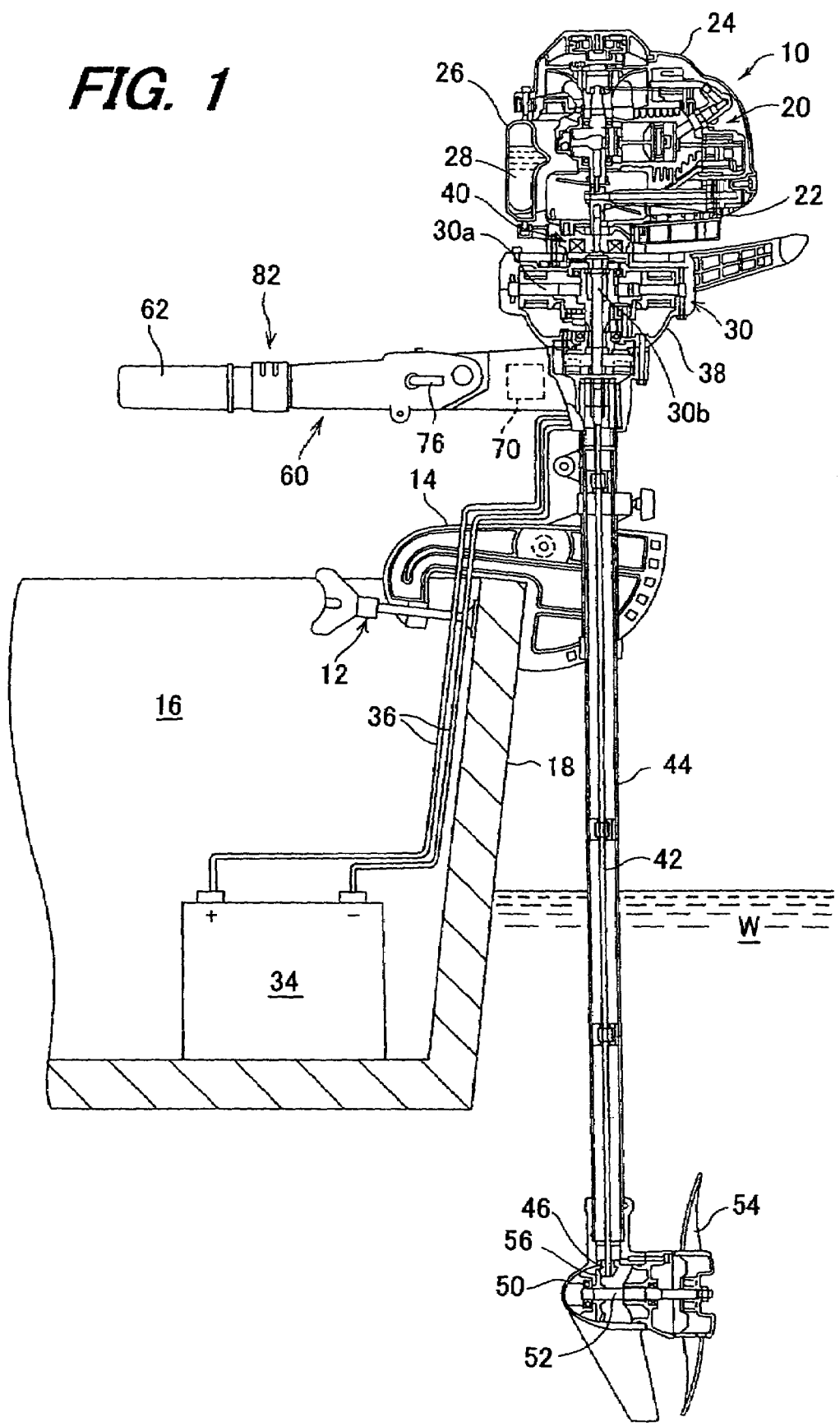
FIG. 1 is a partially sectional view showing an outboard motor according to a first embodiment of this invention.

FIG. 1 is a partially sectional view showing an outboard motor according to a first embodiment of this invention.

The outboard motor is designated by reference numeral 10 in FIG. 1. The outboard motor 10 is adapted to be mounted on the stern or transom 18 of a boat or hull 16 by means of two stern brackets 14 (only one shown in FIG. 1) equipped with a screw-type clamping device 12.

The outboard motor 10 is equipped with an internal combustion engine (power source; hereinafter called "engine") 20 at its upper portion in the vertical direction. The engine 20 is a spark-ignition, one-cylinder gasoline engine with a displacement of about 50 cc and generates the power output of 1.5 kW, i.e., about 2 PS. The engine 20 has its crankshaft or output shaft 22 aligned parallel to the gravity direction, i.e., in the vertical direction. The engine 20 and crankshaft 22 are enclosed by an engine cover 24. A fuel tank 26 is installed near the engine 20 and stores fuel, i.e., gasoline fuel 28 to be supplied to the engine 20.

An electric motor (power source; generator-motor) 30 is installed in the outboard motor 10 vertically downward of the engine 20. The motor 30 is a DC brushless motor comprising a stator 30a and a rotor or output shaft 30b and is supplied with voltage from a battery 34 disposed at the boat 16 via a battery cable 36 and the like to produce an output of several hundred Watts. The electric motor 30 has its output shaft 30b aligned parallel to the vertical direction and is enclosed by a motor cover 38.

An electromagnetic clutch 40 is installed between the engine 20 and the motor 30. Specifically, the lower end of the crankshaft 22 of the engine 20 and the upper end of the output shaft 30b of the motor 30 are connected through the electromagnetic clutch 40.

When the clutch 40 is energized, the crankshaft 22 is connected to the output shaft 30b and when the clutch 40 is de-energized, the interconnection between the crankshaft 22 and output shaft 30b is cut off.

The upper end of a drive shaft or vertical shaft 42 is connected to the lower end of the output shaft 30b of the motor 30. As shown in the drawing, the drive shaft 42 is aligned parallel to the gravity direction and is supported within a drive shaft cover 44 to be rotatable about the axis in the gravity direction. A pinion gear 46 is installed at the lower end of the drive shaft 42 and is disposed in a gear case 50 that is connected to the lower portion of the drive shaft cover 44.

As shown in the figure, a part of the drive shaft cover 44 and the entire gear case 50 are provided at a location in water, i.e., under the water surface when the outboard motor 10 is attached to the boat 16. In FIG. 1, the symbol W indicates seawater or freshwater.

A propeller shaft 52 is supported to be rotatable about the horizontal axis in the gear case 50. One end of the propeller shaft 52 projects from the gear case 50 to rearward of the outboard motor 10 and is attached with a propeller 54. A bevel gear 56 is installed on the outer periphery of the propeller shaft 52 and is rotated by engagement with the pinion gear 46.

Thus the output, i.e., rotational output of the motor 30 is transmitted through the drive shaft 42, pinion gear 46 and bevel gear 56 to the propeller shaft 52 to rotate the propeller 54, thereby producing thrust for driving the boat 16 forward or rearward.

The output, i.e., rotational output of the engine 20 is transmitted through the electromagnetic clutch 40 to the output shaft 30b of the motor 30 and then, like the output of the motor 30, through the drive shaft 42, pinion gear 46 and bevel gear 56 to the propeller shaft 52 to rotate the propeller 54, thereby producing thrust for driving the boat 16 forward or rearward. In other words, the propeller 54 is rotated by either the output of the engine 20 or the output of the motor 30.

As mentioned in the foregoing, the outboard motor 10 comprises a hybrid outboard motor adapted to be mounted on the boat 16, in which the power source composed of the engine 20 and motor 30 can be freely connected to the propeller 54, and is relatively a small outboard motor.

The outboard motor 10 is equipped with a bar handle or tiller 60 at an appropriate position such that the free end of the bar handle 60 projects toward the cockpit of the boat 16. Specifically, the bar handle 60 projects from the motor cover 38 in the forward direction so as to be operable for the boat operator to steer the boat 16. The drive shaft cover 44 is supported by the stern brackets 14 to be rotatable about its vertical axis, so that the operator can steer or maneuver the outboard motor 10 left and right by swinging the bar handle 60 laterally.

Figure 2:
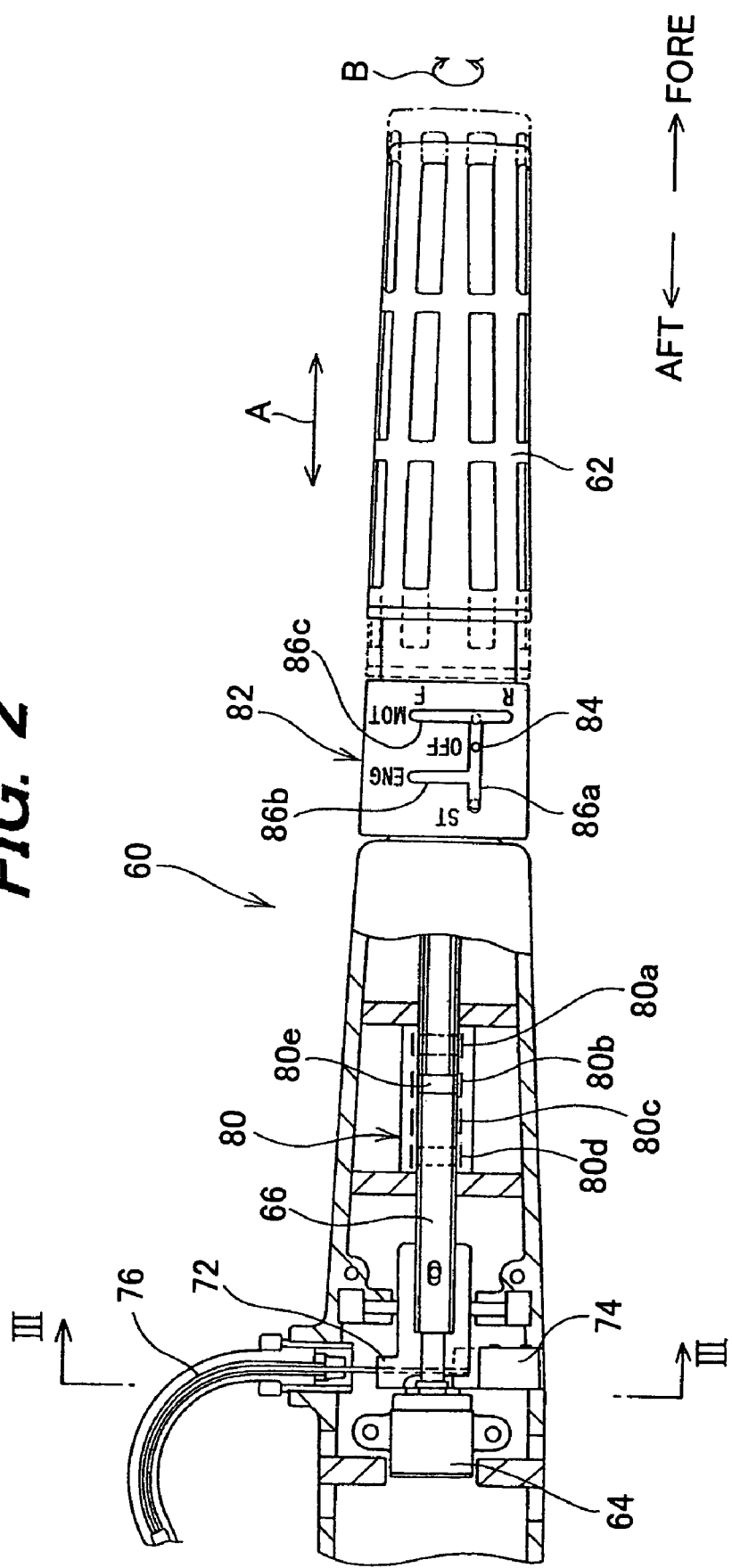
FIG. 2 is an enlarged partially sectional view from above of a bar handle shown in FIG. 1.

FIG. 2 is an enlarged partially sectional view from above of the bar handle 60 shown in FIG. 1.

A throttle grip 62 is provided at the forward (free) end of the bar handle 60 (relative to the direction of forward travel of the boat 16). The throttle grip 62 is operable by the boat operator in either a push-pull mode or a rotate mode. More specifically, the throttle grip 62 can be pushed and pulled in the fore-aft direction, i.e., the longitudinal axis of the bar handle 60 as indicated by the double-headed arrow A in FIG. 2 and be rotated about the longitudinal axis as indicated by the double-headed arrow B, by the boat operator.

A rotation angle sensor (volume sensor) 64 and an electronic control unit (ECU) 70 (shown only in FIG. 1) constituted as a microcomputer are installed inside the bar handle 60. The rotation angle sensor 64 is connected to the throttle grip 62 through a rotary shaft 66 and produces an output or signal proportional to the rotation angle (manipulated variable) of the throttle grip 62 to be inputted to the ECU 70.

Figure 3:
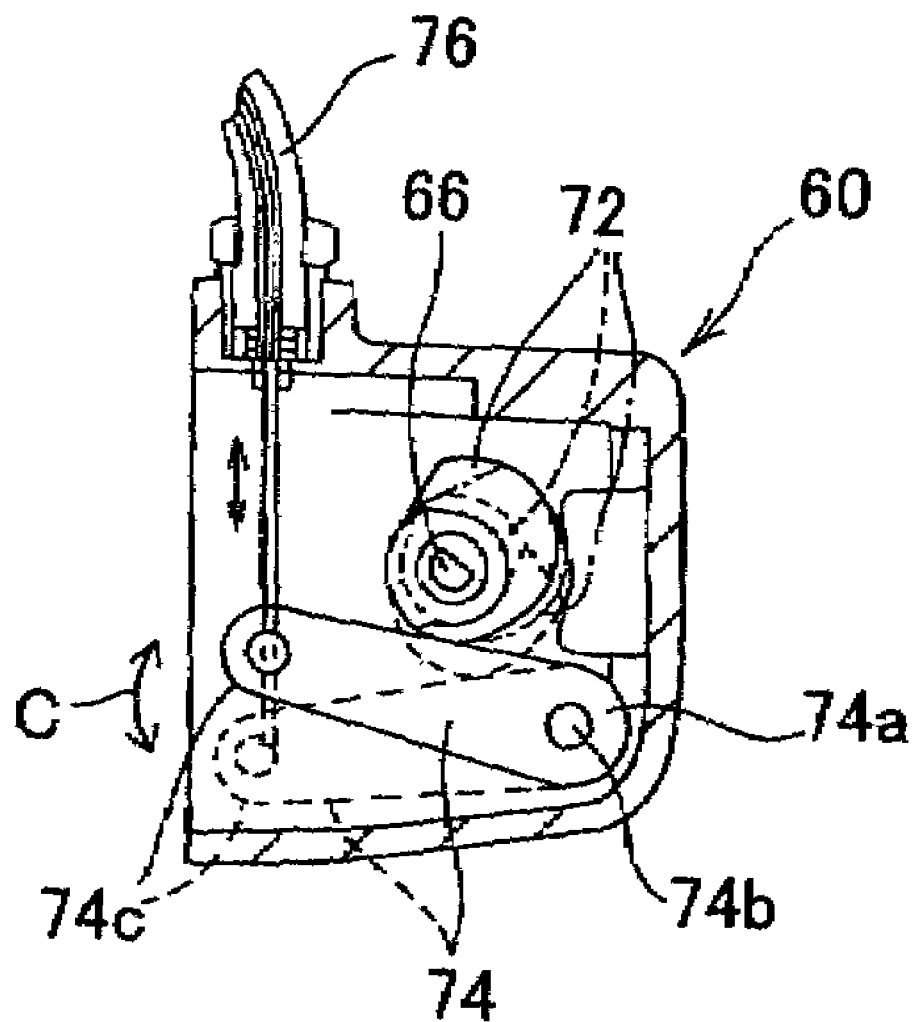
FIG. 3 is a cross-sectional view taken along line III-III in FIG. 2.

FIG. 3 is a cross-sectional view taken along line III-III in FIG. 2.

As shown in FIGS. 2 and 3, a cam 72 is provided on the rotary shaft 66 of the throttle grip 62, and an arm 74 is provided near the cam 72. The arm 74 is supported on a pivot pin 74b at one end 74a so as to be vertically swingable as viewed in FIG. 3 (in the direction indicated by the double-headed arrow C). To the other end 74c of the arm 74 is connected a throttle cable (push-pull cable) 76 whose opposite end is attached to the throttle valve (not shown) of the engine 20.

The operation of the so-configured cam 72 and arm 74 will be explained.

When the boat operator, faced in the direction of forward travel, turns the throttle grip 62 counterclockwise, the cam 72 also turns counterclockwise. As a result, the cam 72 is brought into engagement with the arm 74 to press the other end 74c of the arm downward, as indicated by broken lines in FIG. 3.

When the other end 74c of the arm is pressed downward, the throttle cable 76 connected thereto is pulled downward as viewed in FIG. 3 to operate the throttle valve in the opening direction. In the normal condition of the throttle grip 62 before it is rotated by the operator, the cam 72 does not engage the arm 74, as indicated by solid lines in FIG. 3, i.e., the other end 74c of the arm is not pressed downward, so that the throttle cable 76 is not pulled and the throttle remains wide open.

When the boat operator, facing forward, turns the throttle grip 62 clockwise, the cam 72 also turns clockwise. At this time, the cam 72 does not engage the arm 74, as indicated by alternate long and short dashed lines in FIG. 3. The throttle cable 76 is therefore not pulled downward so that the throttle valve is not operated in the opening direction.

Thus when the boat operator rotates the throttle grip 62 so as to bring the cam 72 into engagement with the arm 74, the throttle cable 76 can be driven in either direction (be pushed or pulled). But when the cam 72 is not engaged with the arm 74, the throttle cable 76 cannot be pushed or pulled.

The explanation of FIG. 2 will be continued.

A slide switch 80 is provided on the rotary shaft 66 of the throttle grip 62. The slide switch 80 has a plurality of (four) electric contacts (fixed terminals) fixed at the throttle grip 62, namely, a first contact 80a for operating the motor 30, a second contact 80b for stopping the power sources (engine 20 and motor 30), a third contact 80c for operating the engine 20, and a fourth contact 80d for starting the engine 20, and further comprises a movable contactor 80e integrally attached to the rotary shaft 66.

The movable contactor 80e is moved fore and aft by pulling and pushing of the throttle grip 62. The slide switch 80 is switched among the aforesaid multiple contacts by movement of the movable contactor 80e and produces an output or signal (ON signal) to be inputted to the ECU 70 in accordance with the contact that the movable contactor 80e is in contact with (i.e., in accordance with the fore-aft position of the throttle grip 62). Thus the slide switch 80 switches among its multiple contacts (first to fourth contacts 80a, 80b, 80c and 80d) in response to push-pull operation of the throttle grip 62.

An indicator panel 82 for showing the position of the throttle grip 62 is provided near the throttle grip 62. The indicator panel 82 is equipped with a pin-shaped protrusion 84 that is connected to the rotary shaft 66 of the throttle grip so as to move together with push-pull and rotation of the throttle grip, and a guide groove 86 for controlling movement of the protrusion 84.

The guide groove 86 comprises a first groove segment 86a running fore-aft, a second groove segment 86b that runs upward in the drawing from a point midway of the first groove segment 86a, and a third groove segment 86c that runs upward and downward from the forward end of the first groove segment 86a as viewed in the drawing.

The relationship between the indicator panel 82 and the slide switch 80 will be explained next. When, as indicated by alternate long and short dashed lines in FIG. 2, the throttle grip 62 is push-pull operated to position the protrusion 84 at the forward end of the first groove segment 86a, i.e., at the meeting point of the first groove segment 86a and third groove segment 86c, the movable contactor 80e of the slide switch 80 is positioned in contact with the first contact 80a.

When, as indicated by solid lines in FIG. 2, the throttle grip 62 is push-pull operated to position the protrusion 84 at a point in the first groove segment 86a lying between the second groove segment 86b and third groove segment 86c, the movable contactor 80e is positioned in contact with the second contact 80b.

When the throttle grip 62 is push-pull operated to position the protrusion 84 at the meeting point between the first groove segment 86a and second groove segment 86b, the movable contactor 80e is positioned in contact with the third contact 80c. When, as indicated by broken lines in FIG. 2, the protrusion 84 is positioned at the rearward end of the first groove segment 86a, the movable contactor 80e is positioned in contact with the fourth contact 80d.

In line with this arrangement, the characters "MOT" indicating a motor 30 operation command are inscribed near the third groove segment 86c. Further, the characters "OFF" indicating a power source stop command are inscribed between the second groove segment 86b and third groove segment 86c, the characters "ENG" indicating an engine 20 operation command are inscribed near the second groove segment 86b, and the characters "ST" indicating an engine 20 start command are inscribed near the rearward end of the first groove segment 86a.

Figure 4:
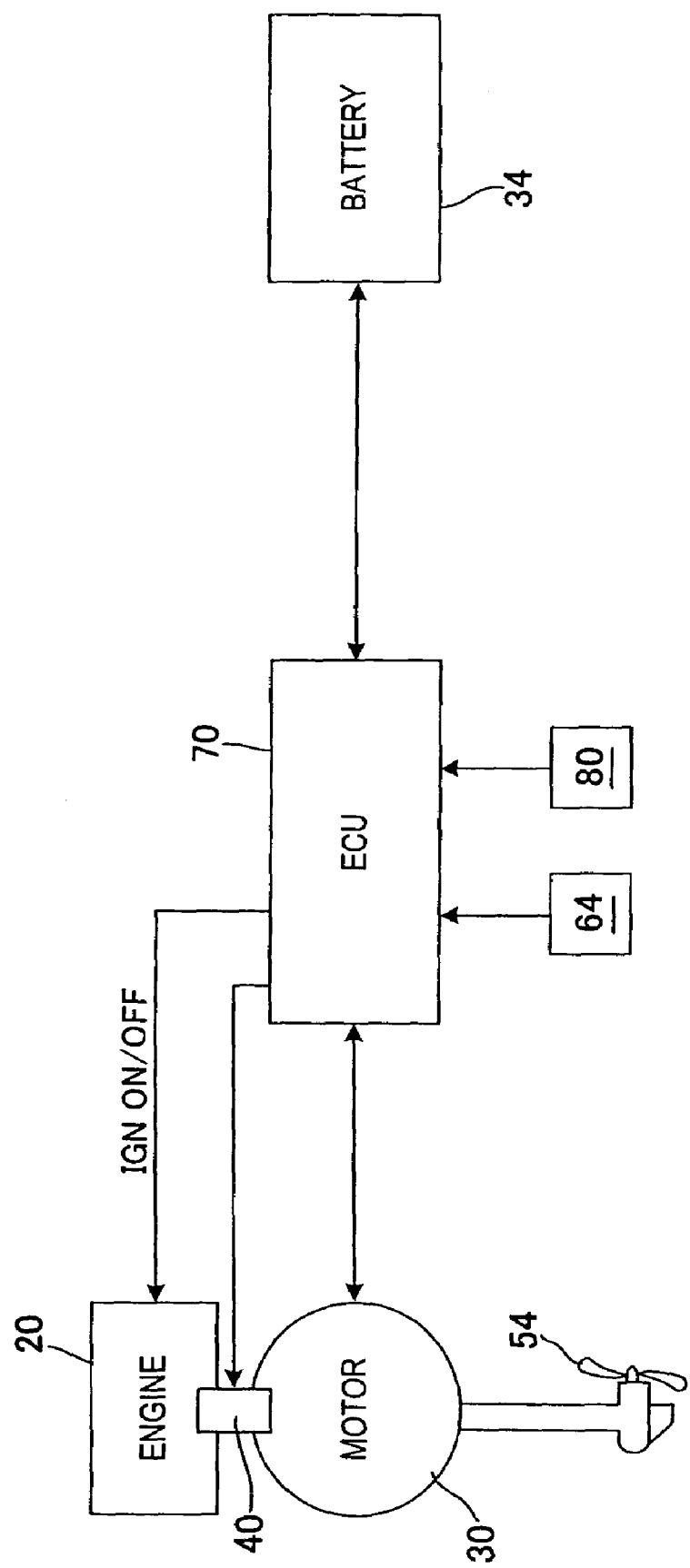
FIG. 4 is a block diagram illustrating the operation of the outboard motor shown in FIG. 1.

FIG. 4 is a block diagram illustrating the operation of the outboard motor 10.

In addition to the rotation angle sensor 64 and slide switch 80, the ECU 70 is connected with the engine 20 (more specifically, the spark plug (not shown) through its ignition circuit), motor 30 and battery 34. The battery 34 serves as an operating power source for the spark plug of the engine 20, the motor 30, the ECU 70, and auxiliary equipment.

FIG. 5 is a chart for explaining the supply of operating power by the battery 34 at the different positions of the slide switch 80.

The operation of the outboard motor 10 will now be explained with reference to FIGS. 2, 4 and 5.

When the throttle grip 62 is push-pull operated to move the protrusion 84 along the first groove segment 86a to select the "MOT" position, the movable contactor 80e is brought in contact with the first contact 80a and the slide switch 80 produces a first contact ON signal to be inputted to the ECU 70.

Upon receiving the first contact ON signal, the ECU 70 applies the voltage of battery 34 to the motor 30 and controls the operation of the motor. Specifically, it controls the motor 30 to rotate in the direction (forward direction) for making the propeller 54 produce forward thrust when the boat operator, facing forward, rotates the throttle grip 62 counterclockwise and to rotate in the direction (reverse direction) for making the propeller 54 produce reverse thrust when the boat operator rotates the throttle grip 62 clockwise. The speed of the motor 30 when the "MOT" position is selected varies with the output of the rotation angle sensor 64, i.e., with the amount of rotation of the throttle grip 62 by the boat operator.

When the throttle grip 62 is push-pull operated to move the protrusion 84 along the first groove segment 86a to select the "ST" position, the movable contactor 80e is brought in contact with the fourth contact 80d and the slide switch 80 produces a fourth contact ON signal to be inputted to the ECU 70.

Upon receiving the fourth contact ON signal, the ECU 70 starts supply of electric power to the spark plug of the engine 20 through the ignition circuit, the electromagnetic clutch 40 and the motor 30. By this, the electromagnetic clutch 40 is energized to connect the crankshaft 22 to the motor output shaft 30b and the operation of the motor 30 is controlled so that it rotates forward. As a result, the crankshaft 22 is rotated by the output of the motor 30, thereby starting the engine 20.

When the throttle grip 62 is push-pull operated to move the protrusion 84 along the first groove segment 86a to select the "ENG" position, the movable contactor 80e is brought in contact with the third contact 80c and the slide switch 80 produces a third contact ON signal to be inputted to the ECU 70.

Upon receiving the third contact ON signal, the ECU 70 supplies electric power to the spark plug of the engine 20 and controls the operation of the spark plug. Specifically, when the boat operator, facing forward, rotates the throttle grip 62 counterclockwise, the cam 72 is brought into engagement with the arm 74 as explained earlier to push or pull the throttle cable 76. As a result, the throttle valve is opened and closed to regulate the throttle opening (amount of intake air) of the engine 20, i.e., so as to regulate the engine speed.

The electromagnetic clutch 40 is not supplied with electric power when the speed of the engine 20 is at or below a predetermined level (e.g., idle speed (2,000 rpm)) but is supplied with electric power when the engine speed rises above the predetermined level. Therefore, the output of the engine 20 is transmitted through the electromagnetic clutch 40 to the propeller 54 when the engine 20 is operating at an engine speed higher than the predetermined speed owing to rotation of the throttle grip 62 by the boat operator.

Also of note is that the motor 30 can operate as a generator capable of recovering kinetic energy and converting it to electric energy for storage in the battery 34, because when not supplied with current it rotates passively driven by the rotation of the engine 20 so long as the crankshaft 22 and output shaft 30b are connected by the electromagnetic clutch 40.

When the throttle grip 62 is push-pull operated to move the protrusion 84 along the first groove segment 86a to select the "OFF" position, the movable contactor 80e is brought in contact with the second switch 80b and the slide switch 80 produces a second contact ON signal to be inputted to the ECU 70.

Upon receiving the second contact ON signal, the ECU 70 stops the operation of the power source (the engine 20 or motor 30) by cutting off the supply of current to the spark plug of the engine 20, the motor 30 and the electromagnetic clutch 40.

The "OFF" position is located between the "ENG" position for operating the engine 20 and the "MOT" position for operating the motor 30, making it impossible to operate the engine 20 and motor 30 simultaneously. Therefore, irrespective of the fact that the configuration enables speed regulation of both the engine 20 and the motor 30 with a single operating member (the throttle grip 62), neither of the operations interferes with the other.

Thus the outboard motor 10 according to the first embodiment is provided with the bar handle 60, the bar handle 60 is equipped with the throttle grip 62 enabling push-pull operation and rotate operation by the boat operator, and one or the other of the engine 20 and the motor 30 is connected to the propeller 54 in accordance with the push-pull operation of the throttle grip 62.

Specifically, it is provided with a power source selector (80, 70) provided at the throttle grip 62 which selects one of the engine 20 and the motor 30 to connect to the propeller in response to the push-pull operation of the operator, an engine speed controller (72, 74) provided at the throttle grip 62 which controls a speed of the engine 20 by regulating a throttle opening of the engine in response to the rotational operation of the operator, and a motor speed controller (64, 70) provided at the throttle grip 62 which controls a speed of the motor 30 in response to the rotational operation of the operator. Owing to this configuration, switching between the power sources can be performed using the throttle grip 62 of the bar handle 60.

In addition, the throttle opening of the engine 20, i.e., the engine speed, is regulated in accordance with the rotating operation of the throttle grip 62 and the speed of the motor 30 is regulated in accordance with the rotating operation of the throttle grip 62. Owing to this configuration, regulation of the speeds of the power sources (the engine 20 and motor 30) can also be performed using the throttle grip 62, thereby avoiding degradation of operability and increase in outboard motor size.

Further, the throttle grip is provided with the cam 72 on the rotary shaft 66 thereof and with the arm 74 connected to the throttle cable 76 whose opposite end is attached to the throttle valve of the engine, and when the cam 72 engages the arm 74 in accordance with the rotating operation of the throttle grip 62, the throttle cable 76 is push-pulled to regulate the throttle opening of the engine.

To put it the other way around, the configuration is such that the throttle cable 76 is not pushed or pulled when the cam 72 is not engaged with the arm 74. More specifically, it is such that when the throttle grip 62 is rotated so as to fully close the throttle opening, the cam 72 does not engage the arm 74 (the throttle cable 76 is not pushed or pulled) and such that from this state it is possible by push-pull operation of the throttle grip 62 to connect the motor 30 to the propeller 54 (select the "MOT" position). Owing to this configuration, the throttle grip 62 can be rotated in the direction of inputting a command for reverse operation of the motor 30, i.e., the boat operator, facing forward, can rotate the throttle grip 62 in the clockwise direction.

In addition, the slide switch 80 is provided with multiple contacts (first to fourth contacts 80a-80d) among which switching is performed in accordance with push-pull operation of the throttle grip 62, thereby connecting one or the other of the power sources to the propeller 54. Owing to this configuration, switching between the power sources can be achieved with a simple structure.

Moreover, the slide switch 80 is configured to include an engine starting contact (the fourth contact 80d) among its multiple contacts, so that starting of the engine 20 can be conducted by push-pull operation of the throttle grip 62.

An outboard motor according to a second embodiment of the invention will be explained next.

Figure 6:
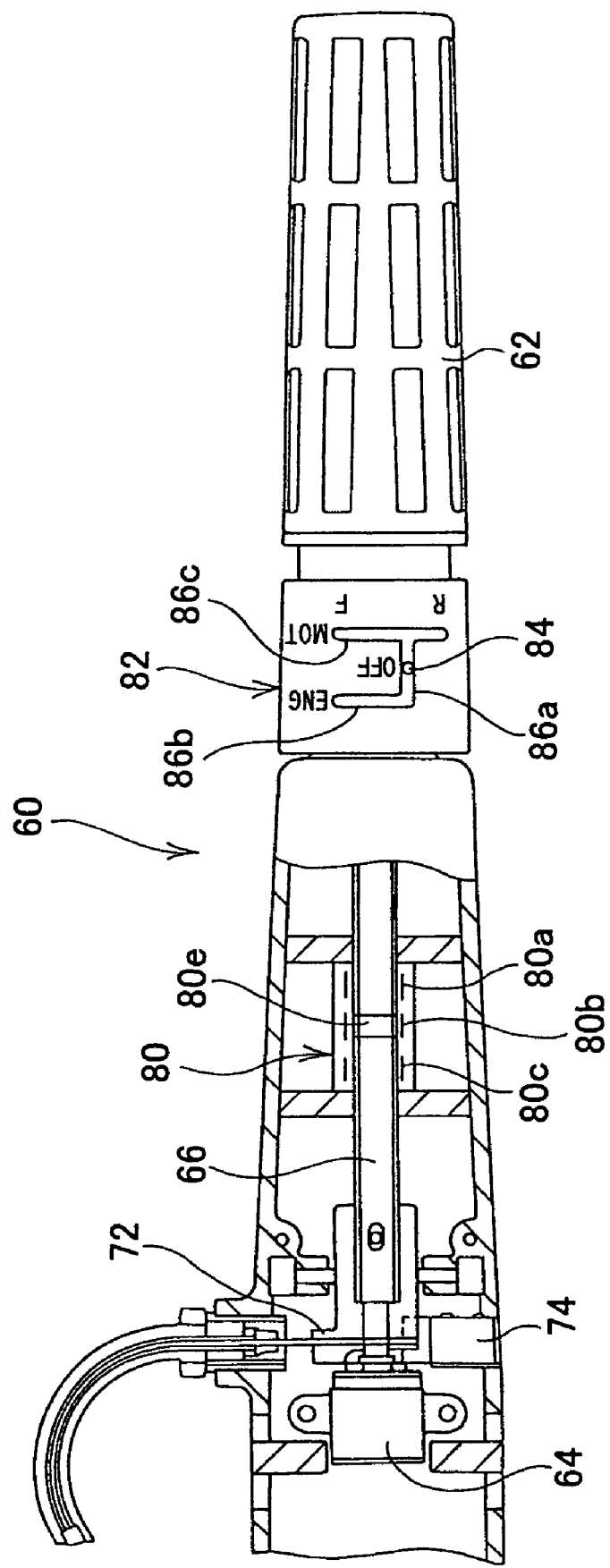
FIG. 6 is an enlarged partially sectional view from above similar to FIG. 2 showing a bar handle of an outboard motor according to a second embodiment of this invention.

FIG. 6 is an enlarged partially sectional view from above similar to FIG. 2 showing the bar handle 60 of the outboard motor according to the second embodiment.

The outboard motor according to the second embodiment of the invention will now be explained with reference to FIG. 6, focusing on the points of difference from the first embodiment.

In the outboard motor according to the second embodiment, the bar handle 60 differs from that of the first embodiment in that the slide switch is not provided with the fourth contact 80d and that the first groove segment 86a of the indicator panel 82 is not provided with the "ST" position, and the engine 20 is equipped with a recoil starter (not shown) for starting the engine.

Thus in the outboard motor 10 according to the second embodiment, the slide switch is not provided with the fourth contact 80d of the first embodiment. Although this requires the engine 20 to be started using the recoil starter, it simplifies the structure of the slide switch 80 and the like.

The second embodiment is the same as the first in other aspects and also provides the same effects as the first embodiment.

The present exemplary embodiments are thus configured to have an outboard motor (10) adapted to be mounted on a stern (18) of a boat (16) and having power sources constituted by an internal combustion engine (20) and an electric motor (30) which are selectively connected to a propeller (54) to propel the boat, and a bar handle (60) whose free end projects toward a cockpit of the boat so as to be operable for an operator to steer the boat; comprising: a throttle grip (62) provided at the free end of the bar handle to be pushed-pulled in a longitudinal axis of the bar handle and to be rotated about the axis by the operator; a power source selector (80, 70) provided at the throttle grip which selects one of the engine and the motor to connect to the propeller in response to the push-pull operation of the operator; an engine speed controller (72, 74) provided at the throttle grip which controls a speed of the engine by regulating a throttle opening of the engine in response to the rotational operation of the operator; and a motor speed controller (64, 70) provided at the throttle grip which controls a speed of the motor in response to the rotational operation of the operator.

In the outboard motor, the power source selector comprises: a slide switch (80) having a plurality of contacts (80a to 80d) respective of which produces a signal corresponding to a position of the switch which is changed in response to the push-pull operation of the operator; and an electronic control unit (70) which inputs the signal produced by the switch and selects one of the engine and the motor to connect to the propeller.

In the outboard motor, the plurality of contacts involves that (80d) for starting the engine.

In the outboard motor, the plurality of contacts involves that (80b) for stopping the engine and the motor.

In the outboard motor, the plurality of contacts involves a first contact (80a) for operating the motor, a second contact (80c) for operating the engine and a third contact (80b) for stopping the engine and the motor, and the third contact is positioned between the first and second contacts in the push-pull operation.

In the outboard motor, the engine speed controller comprises: a cam (72) provided at the throttle grip; and an arm (74) connected to a throttle value of the engine, the arm is provided near the cam such that when the cam is turned in response to the rotational operation of the operator, the arm is pressed by the cam to open the throttle valve of the engine.

In the outboard motor, the motor speed controller comprises: a rotation angle sensor (64) which produces a signal indicative of a rotation angle of the throttle grip in response to the rotational operation of the operator, and an electronic control unit (70) which supplies voltage from a battery to the motor in response to the signal produced by the rotation angle sensor.

Although the motor 30 is exemplified as a DC brushless motor in the foregoing explanation, it can instead be any of various other types of motor.

Although specific values are given for the displacement of the engine 20 and the output of the motor 30 in the foregoing explanation, the described values are examples and this invention is not limited thereto.

While this invention has thus been shown and described with reference to specific exemplary embodiments, it should be noted that the invention is in no way limited to the details of the described arrangements; changes and modifications may be made without departing from the scope of the appended claims.

What is claimed is:

1. An outboard motor adapted to be mounted on a stern of a boat and having power sources constituted by an internal combustion engine and an electric motor which are selectively connected to a propeller to propel the boat, and a bar handle whose free end projects toward a cockpit of the boat so as to be operable for an operator to steer the boat, comprising:
    a throttle grip provided at the free end of the bar handle to be pushed-pulled in a longitudinal axis of the bar handle and to be rotated about the axis by the operator;
    a power source selector provided at the throttle grip which selects one of the engine and the motor to connect to the propeller in response to the push-pull operation of the operator;
    an engine speed controller provided at the throttle grip which controls a speed of the engine by regulating a throttle opening of the engine in response to the rotational operation of the operator; and
    a motor speed controller provided at the throttle grip which controls a speed of the motor in response to the rotational operation of the operator.

2. The outboard motor according to claim 1, wherein the power source selector comprises:
    a slide switch having a plurality of contacts respective of which produces a signal corresponding to a position of the switch which is changed in response to the push-pull operation of the operator; and
    an electronic control unit which inputs the signal produced by the switch and selects one of the engine and the motor to connect to the propeller.

3. The outboard motor according to claim 2, wherein the plurality of contacts involves that for starting the engine.

4. The outboard motor according to claim 3, wherein the plurality of contacts involves that for stopping the engine and the motor.

5. The outboard motor according to claim 3, wherein the plurality of contacts involves a first contact for operating the motor, a second contact for operating the engine and a third contact for stopping the engine and the motor, and the third contact is positioned between the first and second contacts in the push-pull operation.

6. The outboard motor according to claim 1, wherein the engine speed controller comprises:
    a cam provided at the throttle grip; and
    an arm connected to a throttle valve of the engine, the arm is provided near the cam such that when the cam is turned in response to the rotational operation of the operator, the arm is pressed by the cam to open the throttle valve of the engine.

7. The outboard motor according to claim 1, wherein the motor speed controller comprises:
    a rotation angle sensor which produces a signal indicative of a rotation angle of the throttle grip in response to the rotational operation of the operator, and
    an electronic control unit which supplies voltage from a battery to the motor in response to the signal produced by the rotation angle sensor.

* * * * *